United States Patent [19]

Nishiwaki et al.

[11] Patent Number: 4,739,149
[45] Date of Patent: Apr. 19, 1988

[54] CURRENT SENSOR FOR WELDER CONDUCTOR

[75] Inventors: Toshihiro Nishiwaki; Tatsuo Morita, both of Kanagawa, Japan

[73] Assignee: Obara Corporation, Tokyo, Japan

[21] Appl. No.: 21,115

[22] Filed: Mar. 3, 1987

[30] Foreign Application Priority Data

Oct. 3, 1986 [JP] Japan .................. 61-234403

[51] Int. Cl.$^4$ .................................. B23K 9/10
[52] U.S. Cl. .................. 219/130.01; 219/136; 324/119; 324/127
[58] Field of Search ............ 219/130.01, 137 PS, 219/130.32, 136; 324/76 R, 119, 126, 127

[56] References Cited

U.S. PATENT DOCUMENTS

| | | | |
|---|---|---|---|
| 1,800,474 | 4/1931 | Scherer | 324/119 |
| 2,114,865 | 4/1938 | Traver | 324/119 |
| 4,049,946 | 9/1977 | Fluckiger et al. | 219/130.32 |

FOREIGN PATENT DOCUMENTS

| | | | |
|---|---|---|---|
| 3430730 | 3/1985 | Fed. Rep. of Germany | 324/119 |
| 55-128373 | 10/1980 | Japan | 219/130.32 |

*Primary Examiner*—Clifford C. Shaw

*Attorney, Agent, or Firm*—Flynn, Thiel, Boutell & Tanis

[57] ABSTRACT

A current sensor assures the detection of a current flowing through a welder conductor without requiring a particular power source, and indicates the current state with the aid of a lamp. In one embodiment, a welder conductor penetrates a toroidal core across which connects a slider resistor whose sliding arm connects through a rectifier circuit, and a parallel circuit of a capacitor and a resistor, to a lamp. A second embodiment interposed between the parallel circuit and lamp wherein a series circuit of a second resistor and a Zener diode, and a transistor base is connected to a connection point between the second resistor and a Zener diode, and the emitter-collector circuit of which transistor drives the lamp. A third embodiment adds a further series circuit of another lamp and resistor across the parallel circuit and across the series circuit of the second resistor and the Zener diode. Also, the collector of the transistor is connected to the control terminal of a thyristor, the cathode of which thyristor is connected to the output terminal of the rectifier circuit and to the anode of which thyristor the lamp is connected. The other end of which lamp connects to the other output terminal of said rectifier circuit.

4 Claims, 4 Drawing Sheets

CURRENT SENSOR FOR WELDER CONDUCTOR

BACKGROUND OF THE INVENTION

1. Field of the Invention:

The present invention relates to a current sensor for welder conductor for detecting a current flowing through a welder conductor such as cables, shunts, movable arms, and fixed arms, etc., and for thereby informing an operator of whether or not the current so detected is above a prescribed value.

2. Description of the Prior Art:

A welding current should fall in general within a prescribed range for assuring satisfactory welding operation independently of the thicknesses of articles to be welded and material qualities thereof, etc. However, such a current flowing through the welder conductor changes depending on the degree of wear of a welder tip, the rate of breakdown of electric wires, the degree of cooling for the conductor, varieties of supply voltage, etc. It is therefore needed to monitor at all times how much the current is conducted through the welder conductor.

Some current sensors to detect such a welder conductor current are known. One example is shown in FIG. 7 wherein a current is indirectly picked up through a high permeability toroidal core 21, which is formed by winding plural times a coil around a cable 20 through which the current is conducted, and furthermore a light emitting diode (LED) 22 is connected across terminals of the toroidal core. Another example is shown in FIG. 8 wherein a sensor circuit is connected between the terminals of the toroidal core.

These circuits however have some drawbacks. Namely, with the toroidal core 21 of FIG. 7 employed as a welder conductor, the LED permits an AC current to be directly conducted therethrough, and hence it is discontinuously lighted with the result that it is difficult to know a current level because of the indefiniteness of the brightness of light emitted therefrom. In addition, the situation arrangement of FIG. 8 necessitates a separate power source for the sensor circuit.

SUMMARY OF THE INVENTION

To solve the problem of the prior arts, it is an object of the present invention to provide a current sensor for welder conducter capable of definitely indicating the state of the LED lighted in terms of the brightness thereof without use of an external power source.

To achieve the above object, the first invention of the present invention provides a current sensor for welder conductor wherein a slider resistor R1 is connected to both ends 3, 4 of a toroidal core, which a welder conductor penetrates, with a sliding arm 41 thereof being connected to a rectifier circuit 5 having ouput terminals 8, 9, between which a parallel circuit of a capacitor C and a resistor R2 are connected, to both ends 10, 11 of which parallel circuit a lamp LP is connected.

The second invention of the present invention provides a current sensor for welder conductor wherein a series circuit of a second resistor R3 and a Zenor diode Dz is connected to both ends 10, 11 instead of "connecting a lamp LP to both ends 10, 11" in the above first invention, and a transistor TR is connected in the base thereof to the connection point 12 between the second resistor and the Zenor diode, on the emitter-collector circuit of which transistor a lamp means LP is then provided, one end of which lamp means is connected to the one ends 10, 11 of the above series circuit.

The third invention of the present invention provides a current sensor for welder conductor wherein a series circuit of a lamp LP1 and a resistor R7 is connected to both ends instead of "connecting a lamp to both ends 10, 11" in the above first invention, to which both ends 10, 11, the series circuit of the second resistor R3 and the Zener diode Dz is connected, and a transistor TR is connected in the base thereof to a connection point 12 between the second resistor and the Zener diode, the collector of which transistor is connected to the control terminal of a thyristor SCR, the cathode of which thyrister is connected to the output terminal 9 of a rectifier circuit and to the anode of which thyristor lamp means LP2 is connected, the other end of which lamp is connected to the other output terminal 8 of the rectifier circuit.

Operation of the current sensor for welder conductors according to the first invention illustrated in FIGS. 1 and 2 is as follows: with a current I being conducted through a conductor 1 such as cables, shunts, movable arms, and fixed arms, a current I1 is conducted through a toroidal core 2 correspondingly to the above current I, which current I1 is then conducted through a slider resistor R1 to permit voltage in a voltage division ratio corresponding to the position of the sliding arm r1 of the slider resistor to appear on the sliding arm r1, which voltage is rectified through a full-wave rectifier circuit 5 to provide DC voltage, which voltage is then smoothed by a capacitor c for conducting a current through the lamp LP.

The brightness Lx of the lamp LP is altered in response to the current I conducted through the conductor 1 as shown in FIG. 2, and the magnitude of this current can be judged based on the above brightness.

However, in the above circuit arrangement, the magnitude of the current is judged based on the brightness Lx of the display means, and hence it is difficult to clearly judge the magnitude of the voltage.

Hereupon, the second invention is to improve the above situation.

In the second invention illustrated in FIGS. 3 and 4, with a current conducted through both ends 3, 4 of the secondary coil to permit voltage to appear across the resistor R1, divided voltage on the sliding arm r1 of the resistor R1 is rectified through the full-wave rectifier circuit 5, and the resulting rectified voltage is smoothed by a capacitor C to permit DC voltage to appear across both ends 10, 11 of the series circuit. Thereupon, the Zener diode Dz is conducted at voltage beyond Zener voltage to permit voltage to appear across the resistor R3, whereby the transistor TR is conducted to permit a current to flow through the collector circuit thereof for lighting the lamp LP.

The Zener diode Dz does not conduct below the Zener voltage to result in nonconduction of the transistor TR, and thus the lamp Lp is not lighted.

Since a relationship between the current I and the brightness Lx is as illustrated in FIG. 4, if a Zener diode Dz having prescribed Zener voltage is selected, then the lamp is lighted at that prescribed value and indicates the voltage in concern to be more than the prescribed value.

Prescribed voltage at the connection points 10, 11 means that a current flowing through the welder conductor is more than a prescribed value, and hence the fact is displayed.

The above circuit arrangement, however, simply judges that the display means is lighted when the magnitude of the current in concern is more than a prescribed value, and hence makes it difficult to judge whether the current in concern is less than a prescribed value or no current flows through the conductor owing to any fault therein or other troubles.

The third invention of the present invention is to improve the above unfavorable situation.

In the third embodiment illustrated in FIGS. 5 and 6, with a current conducted through both ends 3, 4 of a secondary coil to permit voltage to appear across the resistor R1, divided voltage thereof by the sliding arm r1 is rectified through the full-wave rectifier circuit 5, and the resulting rectified voltage is smoothed by a capacitor C to permit DC voltage to appear on both ends 10, 11 of the series circuit. Hereby, a DC current is allowed to flow through the lamp LP1, which lamp is then lighted simultaneously with the conduction of the conductor by appropriately setting resistance R7 and allowed to indicate the conduction of the conductor. In addition, the Zener diode Dz is conducted at voltage greater than the Zener voltage owing to the DC voltage developed on both ends 10, 11 to permit voltage to appear across the resistor R3 for thereby conducting the transistor TR. based on the conduction of the transistor TR, the thyristor SCR is conducted to light the lamp LP2. Thereupon, since the interruption voltage of the thyristor SCR is low, the lighting state of the lamp can be recognized with ease by lighting it for a long period of time rather than by directly connecting the lamp to the transistor Tr.

Futhermore, provided a diode D is connected in series to the Zener diode Dz as shown in FIG. 3 or FIG. 5, the starting of the conduction of the thyrister and the transistor, etc., may be clarified to make further accurate the lighting state of the lamp.

The above and other objects, features and advantages of the present invention will become more apparent from the following description when taken in conjunction with the accompanying drawings in which preferred embodiments of the present invention is shown by way of illustrative examples.

DESCRIPTION OF THE PREFERRED EMBODIMENT

Figure 1:
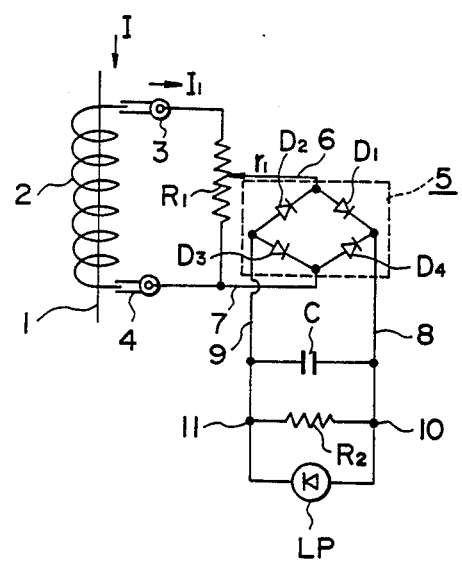
FIG. 1 is a circuit block diagram illustrating a first invention of a current sensor according to the present invention.

An embodiment of the first invention of a current sensor for welder conductor will be described with reference to FIGS. 1 and 2. Designated at 1 is a welder conductor (hereinafter represented by a cable). A toroidal core 2 is provided to permit the cable 1 to penetrate it, and adapted to have a slider resistor R1 connected to both ends 3, 4 thereof. The slider resistor R1 includes a sliding arm r1 to which input terminals 6, 7 of a full-wave rectifier circuit 5 formed by connecting diodes D1, D2, D3, and D4 as a bridge. A capacitor C, and a resistor R2 as well as a lamp LP are parallely connected with output terminals of the rectifier circuit 5.

Figure 2:
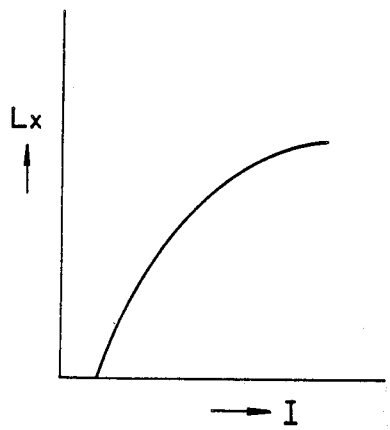
FIG. 2 is a view illustrating a relationship between the magnitude of a current flowing through a conductor and the brightness of a lamp when employing the circuit of FIG. 1.

Referring here to FIG. 2, illustrating a relationship between the intensity I of a current flowing through the cable 1 and the brightness Lx of the lamp, with the increasing magnitude of the current described above, the lamp LP increases the brightness thereof for display.

In succession, an embodiment of the second invention will be described with reference to FIGS. 3 and 4. The same symbols shall be applied to the same portions as those of the first invention.

The arrangement of the second invention is the same as that shown in FIG. 1 for the potions on the upper side of the resistor R2 and the capacitor side of the resistor R2 and the capacitor C, to which a circuit to judge the voltage involved is connected without the direct connection of the lamp unlike the above first invention.

Both ends of the resistor R2 are connected in parallel to both ends 10, 11 of a series circuit of a diode D, a Zener diode Dz, and a resistor R3, which series circuit has a connection point 12 between the Zener diode Dz and the resistor R3 thereof connected to the base of a transistor TR which transistor TR has the emitter thereof connected to a connection point 11 and which furthermore includes the lamp means LP connected between the collector thereof and the connection point 10.

Figure 4:
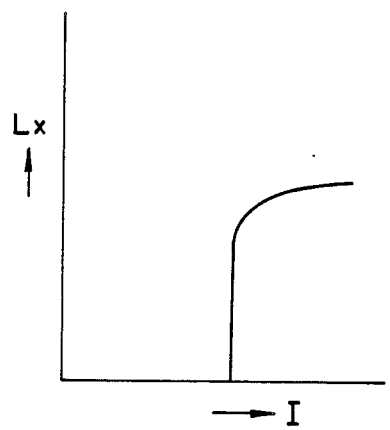
FIG. 4 is a view illustrating a relationship between the magnitude of a current flowing through a conductor and the brightness of a lamp when employing the circuit of FIG. 3.

Referring here to FIG. 4, illustrating a relationship between the intensity I of a current flowing through the cable 1 and the brightness Lx of the lamp, the lamp LP becomes rapidly brilliant as the current flowing through the cable 1 gets a prescribed magnitude, i.e., gets more than the Zener voltage, whereby the lamp LP indicates that a prescribed current has flown through the cable.

Figure 5:
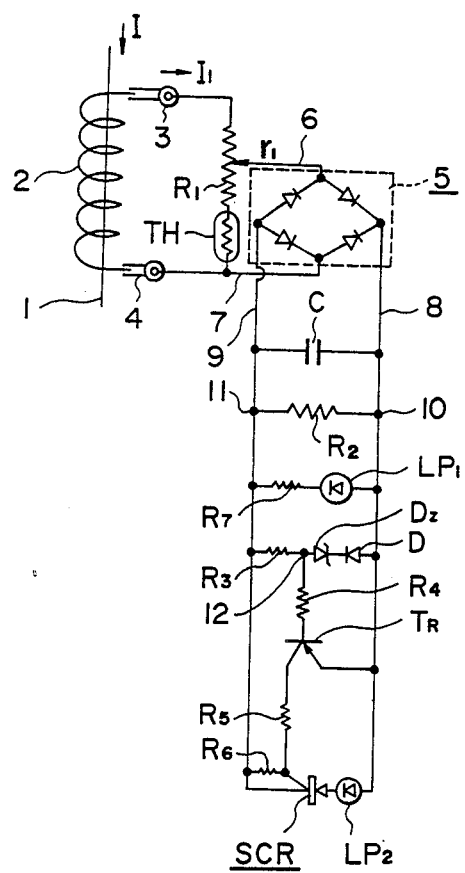
FIG. 5 is a circuit block diagram illustrating the third invention of a current sensor according to the present invention.

Successively, an embodiment of the third invention will be described with reference to FIG. 5 and 6. The same symbol shall be applied to the same portions as those of the first and second inventions.

Figure 3:
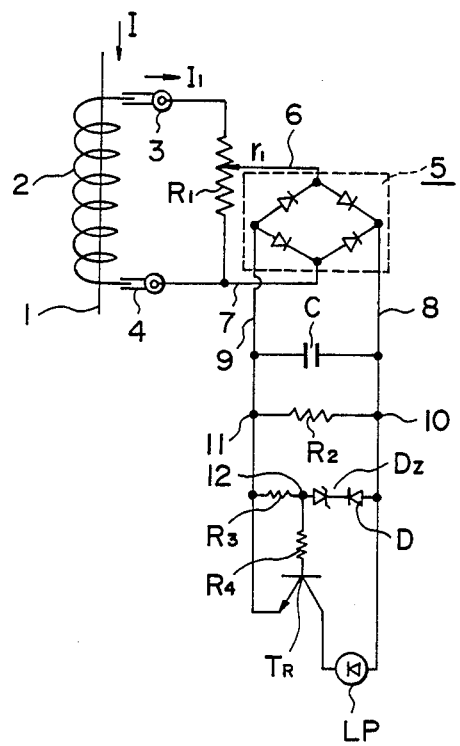
FIG. 3 is a circuit block diagram illustrating a second invention of a current sensor according to the present invention.

The arrangement of the third invention is the same as that of FIGS. 1 and 3 for the portions on the upper side of the resistor R2 and the capacitor C, to which a lamp LP1 and a resistor R7 as well as a circuit to judge the voltage in concern are connected.

Namely, a thyrister SCR is connected in the control terminal to the collector of the transistor TR of FIG. 3, which thyristor has the cathode thereof connceted to an output terminal 9 of the rectifier circuit and the anode thereof connected to an output terminal 8 of the rectifier circuit via the lamp LP2.

Figure 6:
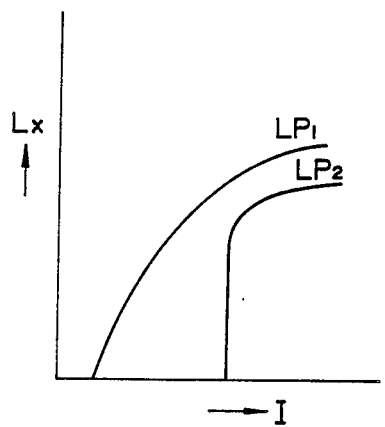
FIG. 6 is a view illustrating a relationship between the magnitude of a current flowing through a conductor and the brightness of a lamp when employing the circuit of FIG. 5.
Figure 7:
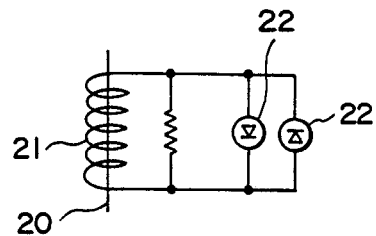
FIG. 7 is a view illustrating a prior example.
Figure 8:
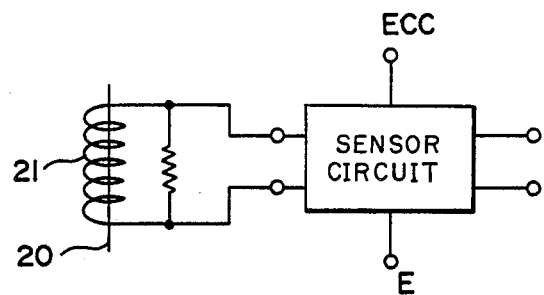
FIG. 8 is a view illustrating another prior example.

Referring here to FIG. 6, illustrating a relationship between the intensity I of a current flowing through the cable 1 and the brightness Lx of each lamp, the lamp LP1 is lighted substantially simultaneously with the current starting to flow through the cable 1, whereby the lamp indicates that the cable 1 is on a conduction state. Moreover, the lamp LP2 becomes rapidly brilliant as the current flowing through the cable 1 gets a prescribed magnitude, i.e., gets more than the Zener voltage, whereby it indicates that a prescribed current has flown through the cable.

Furthermore, provides that a thermister TH is provided between the slider resistor R1 and the imput terminal 7, a variation of an ignition timing based on a temperature change of the thyrister SCR is corrected.

According to the present invention, as described above, no particular power source is needed to detect a current flowing through the welder conductor. The detection of the current can be assured by the lighting of the lamp.

In particular, according to the first invention, since the capacitor is connected to the rectifier circuit and the output terminal thereof, the lamp is adapted not to have an AC current conducted therethrough and hence continuously lighted without flickering to indicate the intensity of the current in terms of the brightness thereof, whereby it makes easy the judgement of the state of the current flowing through the welder conductor.

In addition, according to the second embodiment, it is indicated whether or not the current in concern flowing through the welder conducter is more than a prescribed value based on the lighting or non-lighting of the lamp with further use of the Zener diode and the transistor, so that the judgement of the current state is made clear.

Furthermore, according to the third invention, with further use of the thyristor, it can furthermore make clear whether or not the current in concern is more than a prescribed value to make the judgement much more obvious, while the lamp LP1 can inform an operator of whether or not the concerning conductor is conducted for thereby making a current adjustment very easy.

Although certain preferred embodiments have been shown and described, it should be understood that many changes and modifications may be made therein without departing from the scope of the appended claims.

What is claimed is:

1. A current sensor for a welder conductor comprising:
   (a) a toroidal core for permitting a welder conductor to penetrate it and for thereby picking up a current flowing through said welder conductor;
   (b) a slider resistor connected to both the ends of said toroidal core for permitting voltage to appear thereacross correspondingly to said current flowing through said welder conductor, said slider resistor having a sliding arm thereof serving to divide said voltage appearing thereacross;
   (c) a rectifier circuit connected to said sliding arm and including a parallel circuit of a first resistor and a capacitor connected between the output terminals thereof for rectifying and smoothing said divided voltage to yield a DC voltage;
   (d) a voltage judgement circuit connected to said parallel circuit for judging whether or not the concerning current flowing through said welder conductor is more than a prescribed value, said voltage judgement circuit including a series circuit of a second resistor and a Zener diode and a diode connected to said Zener diode and all arranged in series, said Zener diode being conductive when said DC voltage yielded as the result of said rectification and smoothing is more than Zener voltage of said Zener diode, said voltage judgement circuit furthermore including a transistor connected at the base thereof to a connection point of said second resistor and said Zener diode, said transistor being conductive correspondingly to the conduction of said Zener diode; and
   (e) a lamp means connected at one end thereof to the emitter-collector circuit of said transistor and connected at the other end thereof to one end of said series circuit for indicating the state of conduction of the welder conductor.

2. A current sensor for welder conductor according to claim 1, wherein said series connected diode and Zener diode are oriented with like electrodes adjacent so as to be respectively simultaneously reverse biased and forward biased by said DC voltage, said series diode and Zener diode being on one side of said connection point of said transistor base and said second resistor being on the other side of said connection point.

3. A current sensor for a welder conductor comprising:
   (a) a toroidal core for permitting a welder conductor to penetrate it and for thereby picking up a current flowing through said welder conductor;
   (b) a slider resistor connected to both the ends of said toroidal core for permitting voltage to appear thereacross correspondingly to said current flowing through said welder conductor, said slider resistor having a sliding arm thereof serving to divide said voltage appearing thereacross;
   (c) a rectifier circuit connected to said sliding arm and including a parallel circuit of a first resistor and a capacitor connected between the output terminals thereof for rectifying and smoothing said divided voltage to yield a DC voltage;
   (d) a series circuit of first lamp means and a second resistor connected to said output terminals of said rectifier circuit for indicating the conduction state of the welder conductor;
   (e) a voltage judgement circuit connected to said series circuit of said first lamp means and second resistor for furthermore clarifying the judgement whether or not the current flowing through said welder conductor is more than a prescribed value, said voltage judgement circuit being composed of a series circuit of a third resistor and a Zener diode connected to opposite ends of said series circuit of said first lamp means and second resistor, said Zener diode being conductive when said DC voltage yielded as the result of said Zener diode, said voltage judgement circuit further including a transistor connected at the base thereof to a connection point of said third resistor and said Zener diode, said transistor being conductive correspondingly to the conduction of said Zener diode, said voltage judgement circuit further including a thyristor connected at the control terminal thereof to the collector of said transistor and connected at the cathode thereof to an output terminal of said rectifier circuit, said thyristor being conductive correspondingly to the conduction of said transistor; and
   (f) second lamp means connected at one end thereof to the anode of said thyristor and connected at the other end thereof to the other output terminal of said rectifier circuit for furthermore clarifying whether or not the current flowing through the welder conductor is more than a prescribed value.

4. A current sensor for welder conductor according to claim 3, wherein a diode is connected between said Zener diode and the adjacent end of said series circuit of the third resistor and the Zener diode.

* * * * *

UNITED STATES PATENT AND TRADEMARK OFFICE
CERTIFICATE OF CORRECTION

PATENT NO. : 4 739 149

DATED : April 19, 1988

INVENTOR(S) : Toshihiro NISHIWAKI and Tatsuo MORITA

It is certified that error appears in the above-identified patent and that said Letters Patent is hereby corrected as shown below:

Col. 6, line 46; after "said" (first occurrence) insert ---rectification and smoothing is more than Zener voltage of said---.

Signed and Sealed this

Fifth Day of September, 1989

Attest:

DONALD J. QUIGG

Attesting Officer

Commissioner of Patents and Trademarks